(12) United States Patent
Albrecht et al.

(10) Patent No.: US 11,110,525 B2
(45) Date of Patent: Sep. 7, 2021

(54) ACTIVE-PRESSURE HOLE FINISHING TOOL

(71) Applicant: The Boeing Company, Chicago, IL (US)

(72) Inventors: Mark Albrecht, Lake Stevens, WA (US); Kwok Tung Chan, Seattle, WA (US)

(73) Assignee: The Boeing Company, Illinois (IL)

( * ) Notice: Subject to any disclaimer, the term of this patent is extended or adjusted under 35 U.S.C. 154(b) by 0 days.

(21) Appl. No.: 16/422,435

(22) Filed: May 24, 2019

(65) Prior Publication Data
US 2020/0368827 A1    Nov. 26, 2020

(51) Int. Cl.
*B23B 51/10* (2006.01)
*B23B 51/02* (2006.01)

(52) U.S. Cl.
CPC .......... *B23B 51/101* (2013.01); *B23B 51/102* (2013.01); *B23B 51/02* (2013.01); *B23B 51/108* (2013.01); *B23B 2220/08* (2013.01); *B23B 2260/004* (2013.01); *B23B 2270/025* (2013.01); *B23B 2270/24* (2013.01); *B23B 2270/26* (2013.01)

(58) Field of Classification Search
CPC .............. B23B 51/108; B23B 2220/04; B23B 2220/08; B23B 51/02; B23B 2270/025; B23B 2270/26; B23B 2260/004; B23B 51/101; B23B 51/102; B23B 51/105
See application file for complete search history.

(56) References Cited

U.S. PATENT DOCUMENTS

| | | | | |
|---|---|---|---|---|
| 2,373,474 A | * | 4/1945 | Heyer | ................ B23B 51/102 408/26 |
| 3,572,182 A | * | 3/1971 | Macdonald | ........... B23B 51/102 408/226 |
| 3,940,214 A | * | 2/1976 | Waschek | ............... B23B 51/101 408/26 |

(Continued)

FOREIGN PATENT DOCUMENTS

| | | | | |
|---|---|---|---|---|
| DE | 102008044802 A1 | * | 3/2010 | ........... B23B 51/102 |
| EP | 0519233 A1 | * | 12/1992 | ........... B23B 51/108 |

(Continued)

*Primary Examiner* — Eric A. Gates
*Assistant Examiner* — Paul M Janeski
(74) *Attorney, Agent, or Firm* — Kunzler Bean & Adamson

(57) ABSTRACT

Provided is cutting tool. The tool, in certain examples, includes a drill body that defines a drill axis, and a tool window formed in the drill body. The tool also includes a drill bit extending from the drill body, and a material reworking attachment ("MRA") coupled to the drill body and storable within the tool window. The MRA is extendable from a stored position into either a surface-finishing position or a material-removal position. The MRA includes a first chamfering blade, a second chamfering blade, and a finishing surface interposed between the chamfering blades. The tool also includes a position manager to detect a position of the cutting tool with reference to a workpiece, and an actuator to transition the MRA from the stored position to the material-removal position, followed by a transition to the surface-finishing position, and followed by a transition to material-removal position.

20 Claims, 11 Drawing Sheets

(56) References Cited

U.S. PATENT DOCUMENTS

| | | | | |
|---|---|---|---|---|
| 5,209,617 | A * | 5/1993 | Heule | B23B 51/102 |
| | | | | 408/178 |
| 5,256,010 | A * | 10/1993 | Hehl | B23B 51/102 |
| | | | | 408/11 |
| 5,857,813 | A * | 1/1999 | Kress | B23B 29/03446 |
| | | | | 408/1 R |
| 6,331,093 | B1 * | 12/2001 | Graham | B23B 29/02 |
| | | | | 408/1 R |
| 7,179,024 | B2 * | 2/2007 | Greenhalgh | B23B 51/0018 |
| | | | | 408/224 |
| 9,120,163 | B2 | 9/2015 | Studer | |
| 9,517,511 | B1 * | 12/2016 | Sisco | B23B 35/00 |
| 9,751,136 | B2 * | 9/2017 | Mickelson | B23B 51/102 |
| 10,105,765 | B2 | 10/2018 | Studer | |
| 2011/0116880 | A1 * | 5/2011 | Nakamura | B23B 29/03425 |
| | | | | 408/1 R |
| 2011/0164937 | A1 * | 7/2011 | Byrne | B23B 51/08 |
| | | | | 408/200 |
| 2020/0001377 | A1 * | 1/2020 | Huang | B23B 51/101 |

FOREIGN PATENT DOCUMENTS

| | | | | | |
|---|---|---|---|---|---|
| JP | | 57205005 | A * | 12/1982 | B23B 51/08 |
| JP | | 60259302 | A * | 12/1985 | B23B 29/03446 |
| WO | WO-2005037473 | A1 * | 4/2005 | | B23B 51/108 |

* cited by examiner

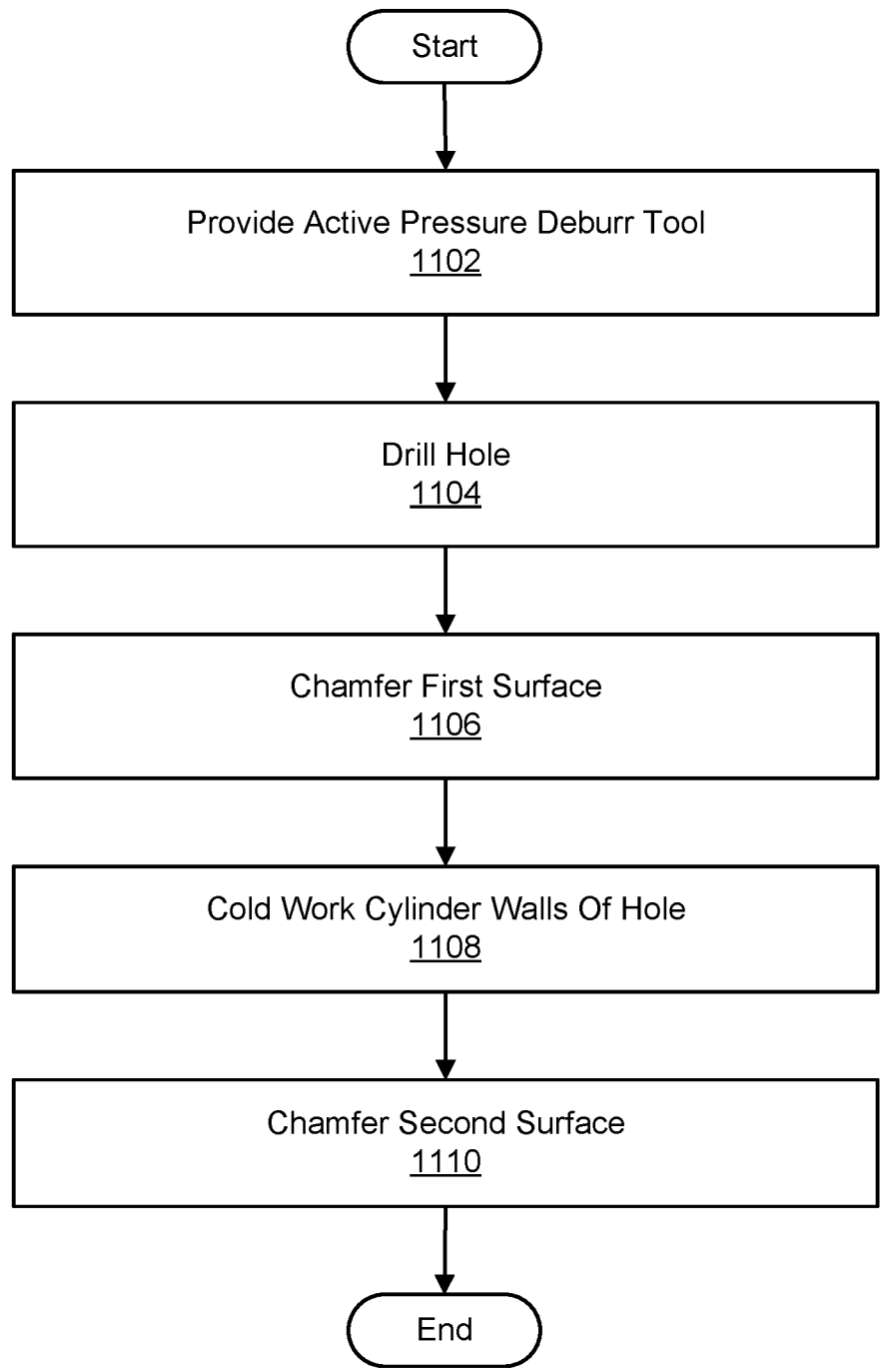

ACTIVE-PRESSURE HOLE FINISHING TOOL

FIELD

This disclosure relates generally to cutting tools, and more particularly to a combination cutting and active-pressure hole finishing tool.

BACKGROUND

Cutting tools, especially twist drills, are known for creating boreholes in workpieces. In manufacturing processes, after a drilling operation forms a borehole in the workpiece, burrs on both sides of the bore must be removed. In a typical borehole forming process, a borehole is drilled, parts are disassembled, the borehole are deburred, parts are reassembled, and finally permanently fastened. These multiple steps often require tool changes to drill and deburr on both a near side and a far side of the workpiece, which adds time and expense to the manufacturing process. If cold working or burnishing the borehole walls is desired, another tool change is required.

SUMMARY

The subject matter of the present application has been developed in response to the present state of the art, and in particular, in response to the shortcomings of conventional cutting tools, that have not yet been fully solved by currently available techniques. Accordingly, the subject matter of the present application has been developed to provide an apparatus that overcomes at least some of the above-discussed shortcomings of prior art techniques.

Disclosed herein is an apparatus for an active-pressure deburring, cold-working, and burnishing cutting tool. The tool, in certain examples, includes a drill body that defines a drill axis, and a tool window formed in the drill body. The tool also includes a drill bit extending from the drill body, and a material reworking attachment ("MRA") coupled to the drill body and storable within the tool window. The MRA is extendable from a stored position into either a surface-finishing position or a chamfering position. The MRA includes a first chamfering blade, a second chamfering blade, and a finishing surface interposed between the chamfering blades. The tool also includes a position manager to identify a position of the cutting tool with reference to a workpiece, and an actuator to transition the MRA from the stored position to a first chamfering position, followed by a transition to the surface-finishing position, and followed by a transition to a second chamfering position. The tool may select to perform the transitions in any order desired once the bore has been cut in the workpiece.

In certain examples, the actuator is a piston disposed within the drill body, and includes a piston shaft that engages the material reworking attachment. The piston is moveable to cause a material-reworking-attachment transition from a stored position to the surface-finishing position or the chamfering position. The piston is in fluid communication with a variable control valve that controls a pressure of a fluid that applies a force to the piston. Additionally, the tool includes a controller operatively coupled with the variable control valve to adjust the pressure of the fluid.

In certain examples, the actuator comprises an electric actuator disposed within the drill body. The electric actuator has a shaft that engages the material reworking attachment and is moveable to cause a material-reworking-attachment transition from a stored position to the cold-working position or the chamfering position.

A bore formed by the drill bit includes a hole wall extending between a first workpiece surface and a second workpiece surface, where the drill bit cuts the bore starting with the first workpiece surface and exits through the second workpiece surface. In some examples, the first chamfering blade is configured to deburr a hole formed in the first workpiece surface when the material reworking attachment is in a first chamfering position that is angled relative to the drill axis. The second chamfering blade is configured to deburr a hole formed in the second workpiece surface when the material reworking attachment is in a second chamfering position that is angled relative to the drill axis.

Surface finishing may include cold working and/or burnishing. Cold working applies residual compressive stress to increase join strength. Burnishing improves surface finish of the bore to increase join strength. The finishing surface is configured to engage the hole wall to cold work and/or burnish the hole wall. The finishing surface, in certain examples, is a roller-pin bearing disposed between the first chamfering blade and the second chamfering blade. The surface used for cold working and burnishing may be the same surface such that tools enables material compression and improved surface finish simultaneously or may be separate.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter and are not therefore to be considered to be limiting of its scope, the subject matter will be described and explained with additional specificity and detail through the use of the drawings, in which:

FIG. 11 is a schematic flowchart diagram illustrating one example of a method for active-pressure surface finishing in accordance with examples of the present disclosure.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples. Like reference numbers signify like elements throughout the description of the figures.

Figure 1:
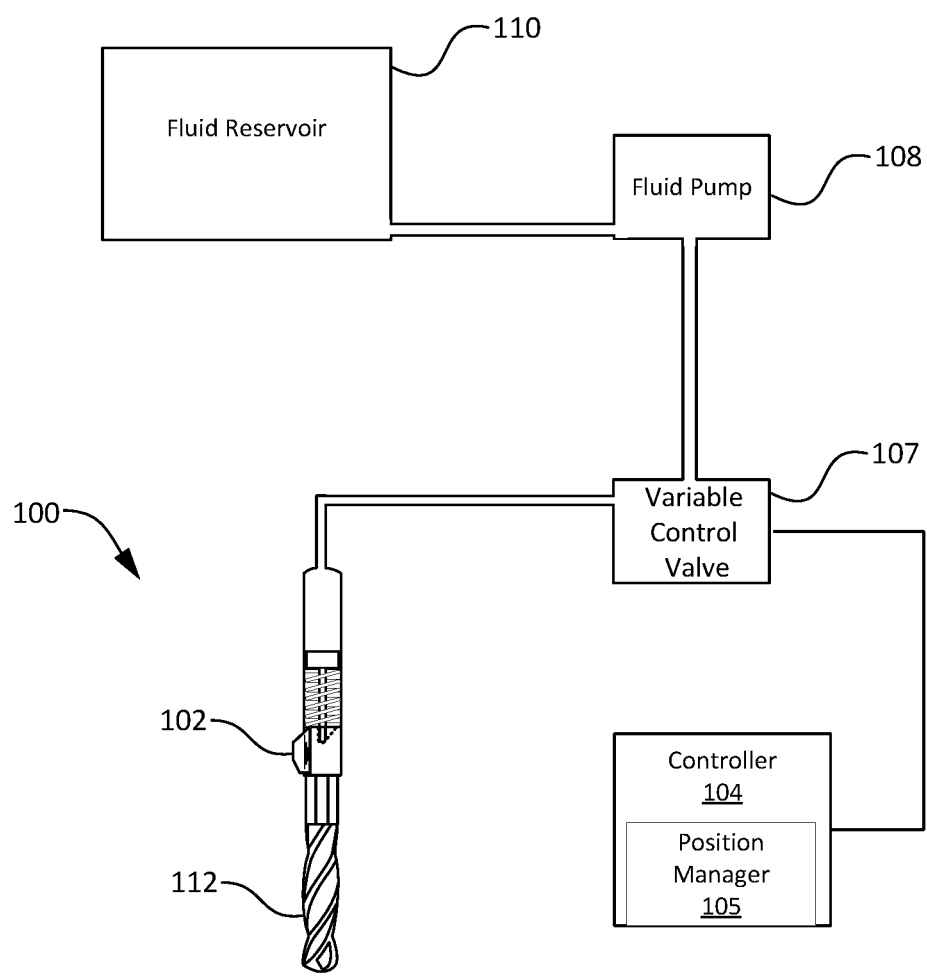
FIG. 1 is a diagram illustrating one example of a cutting system having a material reworking attachment in accordance with examples of the present disclosure.

FIG. 1 is a diagram illustrating one example of a cutting system 100 having a material reworking attachment 102 in accordance with examples of the present disclosure. The cutting system 100, in certain examples, integrates the material reworking attachment 102 on a cutting tool shaft that is intended for producing a bore in a workpiece, deburring and/or chamfering both a near-side edge of the bore and a far-side edge of the bore, applying pressure to a borehole wall to cold-work the borehole surface, and applying a fine finish to a borehole wall to burnish the borehole surface.

In certain examples, the cutting system 100 includes a controller 104 that monitors and actuates a pressure the material reworking attachment 102 applies to the borehole surface via an actuator. The actuator, in one example, is a variable control valve 107 that modulates a pressure of a fluid (i.e., gas or liquid) that acts on the material reworking attachment 102. Alternatively, the actuator may be an electrical actuator as described below in greater detail. Beneficially, the controller 104 and the actuator allow for active control of the material reworking attachment 102 with cutting operations in stackups of different materials. A position manager 105 is operatively coupled with the controller 104 and configured to identify a position of material reworking attachment 102 with reference to the workpiece. The position manager 105, in certain examples, is a sensor (e.g., an ultrasonic positioning sensor) configured to detect the position of the cutting tool 100. Alternate positioning sensors are contemplated. In other embodiments, the position manager 105 maintains a position of the cutting tool 100 using pre-programmed numerically-controlled codes. Stated differently, using numerically-controlled methods, such as tracking the number of steps a stepper motor makes, the position manager 105 tracks and maintains the position of the cutting tool 100. In the above described example that modulates the pressure of a fluid to control the material reworking attachment 102, the cutting system 100 may include a fluid pump 108 and a fluid reservoir 110. The fluid may also be utilized as a coolant that is pumped through a drill bit 112 of the cutting system 100.

Figure 2:
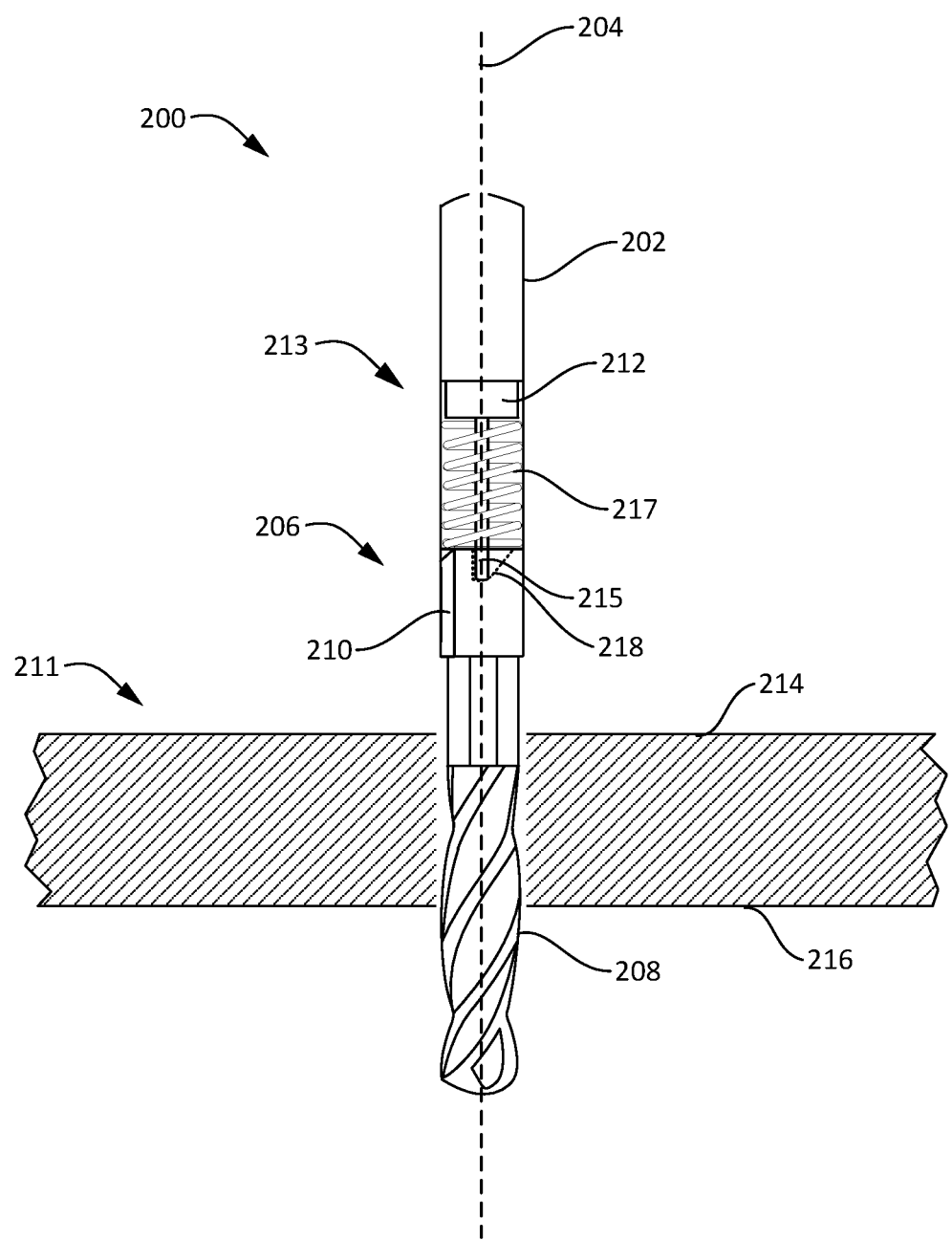
FIG. 2 is a side-view diagram illustrating a partial cross-sectional view of a cutting tool in accordance with examples of the present disclosure.

FIG. 2 is a side-view diagram illustrating a partial cross-sectional view of a cutting tool 200 in accordance with examples of the present disclosure. The cutting tool 200, in some examples, includes a drill body 202 that forms a generally tubular housing. The drill body 202 defines a drill axis 204 that extends longitudinally through the drill body 202. The drill body 202 is formed with a tool window 206, or cut-out, formed in an exterior surface of the drill body 202.

In one example, a drill bit 208 is coupled to the drill body 202 to form a continuous cutting tool 200. The drill bit 208 may be formed of a hard metal suitable for cutting a bore in a workpiece 211. The drill body 202 functions as a drill shank to transmit torque to the drill bit. Additionally, as will be described below in greater detail, the drill body 202 is configured to transfer a coolant through the drill body 202 to the drill bit 208. The drill bit 208 may be formed of a steel or other metallic compound and have a cutting geometry suitable for cutting bores in a variety of different materials. Coatings may also be applied to the drill bit 208 to improve the hardness and/or wear resistance of the drill bit 208.

In certain examples, the cutting tool 200 includes a material reworking attachment ("MRA") 210. The MRA 210 is movably coupled to the drill body 202. In some examples, the MRA 210 is pivotally coupled at one edge to the drill body 202 and configured to transition from a stored position within the tool window 206 to an extended position in a direction angled relative to the drill axis 204. The extended position includes a surface-finishing position and/or a material-removal position. The surface-finishing position places the MRA 210 in a position to cold work and/or burnish the borehole cylinder wall. The material-removal position places the MRA 210 in a position where it can be used to chamfer or deburr depending upon the desired material removal operation performed by the cutting tool 200. The MRA 210, in one example, is moveable in a direction that is transverse to the longitudinal drill axis 204. An actuator 213 is disposed within the drill body 202 and moveable longitudinally with respect to the drill axis 204 to cause the MRA 210 to transition from the stored position within the tool window 206 to the extended position.

In certain examples, the actuator 213 is a spring-loaded piston 212 and piston shaft 215. The actuator 213 further includes a spring 217. The spring 217 is a compression spring that urges the piston 212 to return to a default position, resulting in the MRA 210 being stored in the tool window 206. A fluid may be pumped into the drill body 202 to apply a force to the piston 212 and piston shaft 215 that causes the piston 212 to move longitudinally along the drill axis 204. The force may be increased or decreased. The piston shaft 215 engages a ramp 218 in the MRA 210 which causes the MRA 210 to project outward from the drill body 202 when pushed by the piston shaft 215. When pressure is reduced, the spring 217 reverses the direction of the piston 212 and the piston shaft 215, and the MRA 210 pivots towards the drill axis 204 and stores within the tool window 206.

The drill bit 208 is configured to cut a bore in the workpiece 211. The workpiece 211 may be formed of a single material, as depicted, or the workpiece may be of laminate-style construction with multiple adjacent layers of varying materials. The drill bit 208 begins cutting a bore by engaging the first, or near-side, surface 214 of the workpiece 211. The drill bit 208 is configured to cut the bore from the first surface 214 to the second, or far-side, surface 216.

The MRA 210 is provided with multiple finishing surfaces, as will be described in greater detail below. These finishing surfaces include chamfering/deburring surfaces for reaming the bore at the first surface 214 and the second surface 216. The surfaces may also include blades/surfaces for spot facing, countersinking, and counter boring. The finishing surface also includes a cold-working surface that may be used to cold work the bore wall surfaces formed by the drill bit 208. In another form the finishing surface also includes a burnishing surface that may be used to burnish the bore wall surfaces formed by the drill bit 208. Beneficially, the cutting tool 200 combines the functions of multiple finishing tools into a single cutting tool 200. A single tool drastically reduces the manufacturing time by eliminating the need to, for example, drill a hole, change the drill bit for a deburring tool, and then change again for a cold-working or burnishing tool.

Figure 3:
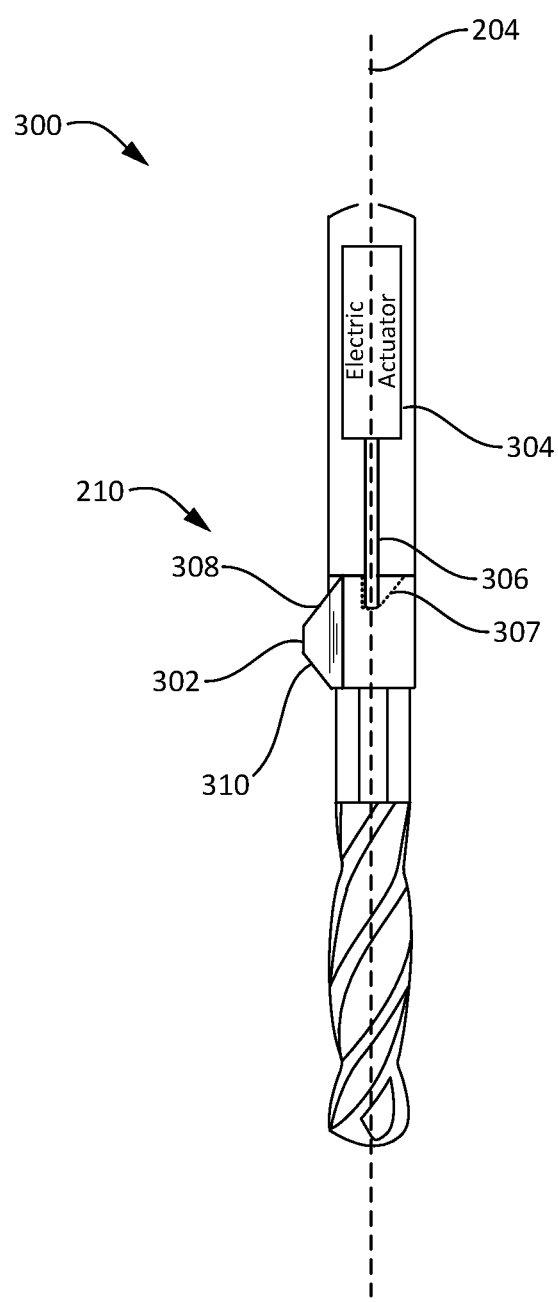
FIG. 3 is a side-view diagram illustrating another example of a cutting tool in accordance with examples of the present disclosure.

FIG. 3 is a side-view diagram illustrating another example of a cutting tool 300 in accordance with examples of the present disclosure. The depicted example illustrates one example of an actuator that does not require pressure from a fluid for operation. For example, an electric actuator 304 may be disposed within the drill body 202 and operative to move the MRA 210 from a stored position to an extended position. In particular, the electric actuator 304 may be a linear actuator with a shaft 306 that extends and retracts axially. In alternative embodiments, the electric actuator 304 is a voice coil motor, or any other electrically activated actuator capable of adjusting a position of the shaft 306. In a similar manner to that described above with reference to FIG. 2, the shaft 306 engages a ramp 307 to extend the MRA 210.

The example of FIG. 2 depicted the MRA 210 in the stored position within the tool window. FIG. 3 depicts the MRA 210 in an extended position due to the shaft 306 pushing on the ramp 307. The actuators of FIGS. 2 and 3 may be replaced with any device that is capable of extending and/or retracting the MRA 210.

As discussed above, the MRA 210 includes one or more finishing surfaces. The depicted example illustrates an MRA 210 with a first chamfering blade 308, a second chamfering blade 310, and a finishing surface 302 for cold-working and/or burnishing. The first chamfering blade 308 and the second chamfering blade 310 are arranged to engage different openings in the workpiece 211. For example, the second chamfering blade 310 is useful to deburr/chamfer an opening in the near-side surface 214. In certain examples, the first chamfering blade 308 is configured and angled for deburring/chamfering an opening in the far-side surface 216. Stated differently the second chamfering blade 310 "faces" the forward direction (i.e., the direction of travel of the cutting tool as it cuts through the workpiece 211), and the first chamfering blade 308 faces the reverse direction (i.e., the direction of travel of the cutting tool as it is withdrawn from the workpiece 211).

The first chamfering blade 308 is disposed at an angle relative to the drill axis 204. In other words, an imaginary axis extending along the first chamfering blade 308 intersects the drill axis 204 at an angle. The angle, in certain examples, is less than 90 degrees. Similarly, the second chamfering blade 310 is disposed at an angle relative to the drill axis 310. The angles of the first chamfering blade 308 and the second chamfering blade 310 may be substantially equivalent. Alternatively, the angles may be unique. The angles may be selected to produce a desired chamfer length and angle for a desired fastener. For example, a desired length and an angle of 45 degrees.

In certain examples, the finishing surface 302, which performs cold-working and burnishing, is interposed between the first chamfering blade 308 and the second chamfering blade 310, as depicted. A surface that forms the chamfering blades 308, 310 may be continuous and also form the finishing surface 302. In an alternative example, the finishing surface 302 may be formed by a rotatable member, such as a roller-pin bearing as will be discussed in greater detail below with reference to FIG. 8. The finishing surface 302 applies pressure to the bore surfaces to compress the metallic (or other) surface. Cold-working the newly cut surfaces induces residual stress of the bore which increases the hardness, yield strength, and tensile strength of the bore surfaces. The finishing surface 302 applies pressure to the bore surfaces to improve finish of the metallic (or other) surface. Burnishing the newly cut surfaces exceeds yield strength of the material along the bore wall which produces a fine finish and the increases the hardness, yield strength, and tensile strength of the bore surfaces. Beneficially, the cutting tool of the present disclosure is able to cut, chamfer/deburr, and cold-work and burnish without the need to change tools.

Figure 4:
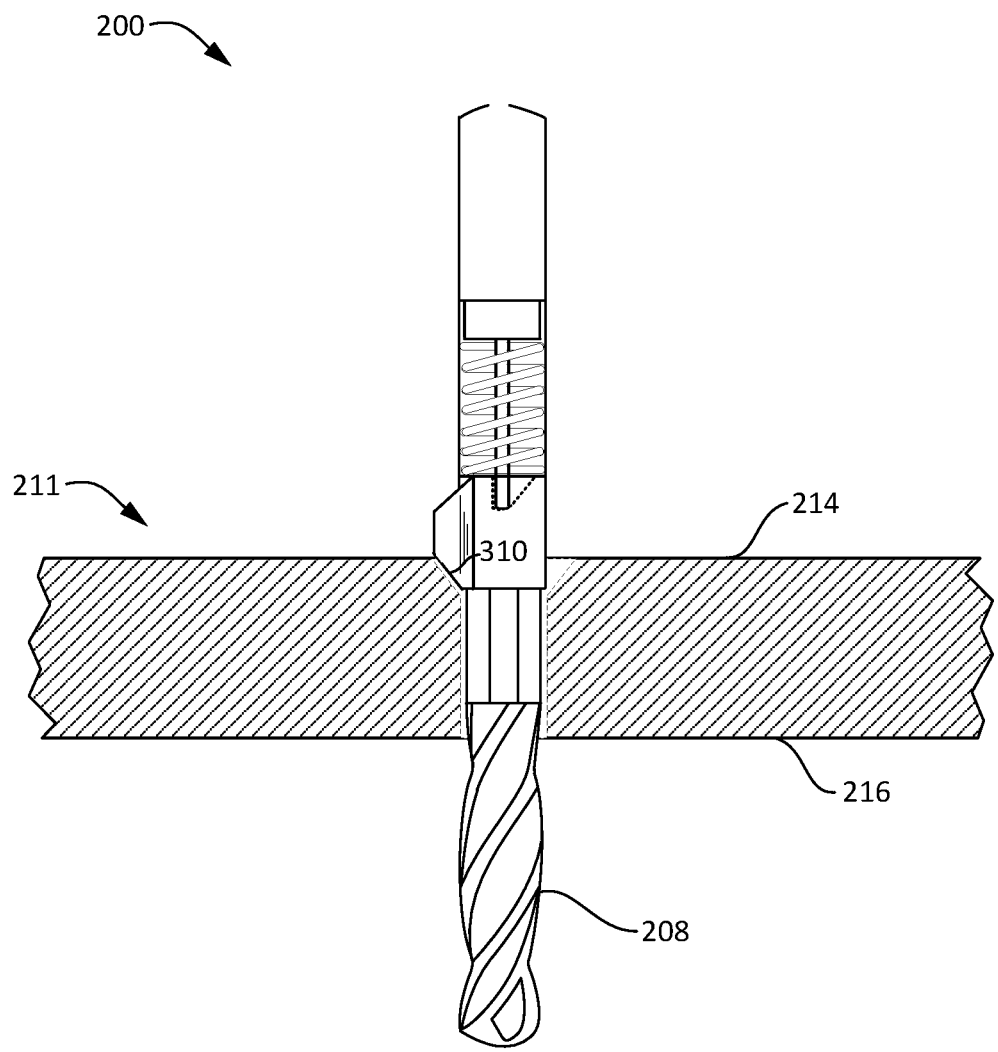
FIG. 4 is a side-view diagram illustrating one example of the cutting tool during the drilling process in accordance with examples of the present disclosure.

FIG. 4 is a side-view diagram illustrating one example of the cutting tool 200 during the drilling process in accordance with examples of the present disclosure. The drill bit 208 cuts a bore in the workpiece 211 that extends from the near-side surface 214 to the far-side surface 216. Once the drill bit 208 has passed through the workpiece 211, the controller 104 instructs the actuator to extend the MRA 210. FIG. 4 depicts the material-removal position of the second chamfering blade 310, deburring and creating a chamfer in the near-side surface 214. In certain embodiments, the cutting tool 200 is extended into the workpiece 211 a certain distance that causes the second chamfering blade 310 to only deburr the near-side surface 214 without chamfering the near-side surface 214. The controller 104 may instruct the cutting too to reverse slightly and retract the MRA 210 following the completion of the deburr/chamfer operation of the near-side surface 214.

Figure 5:
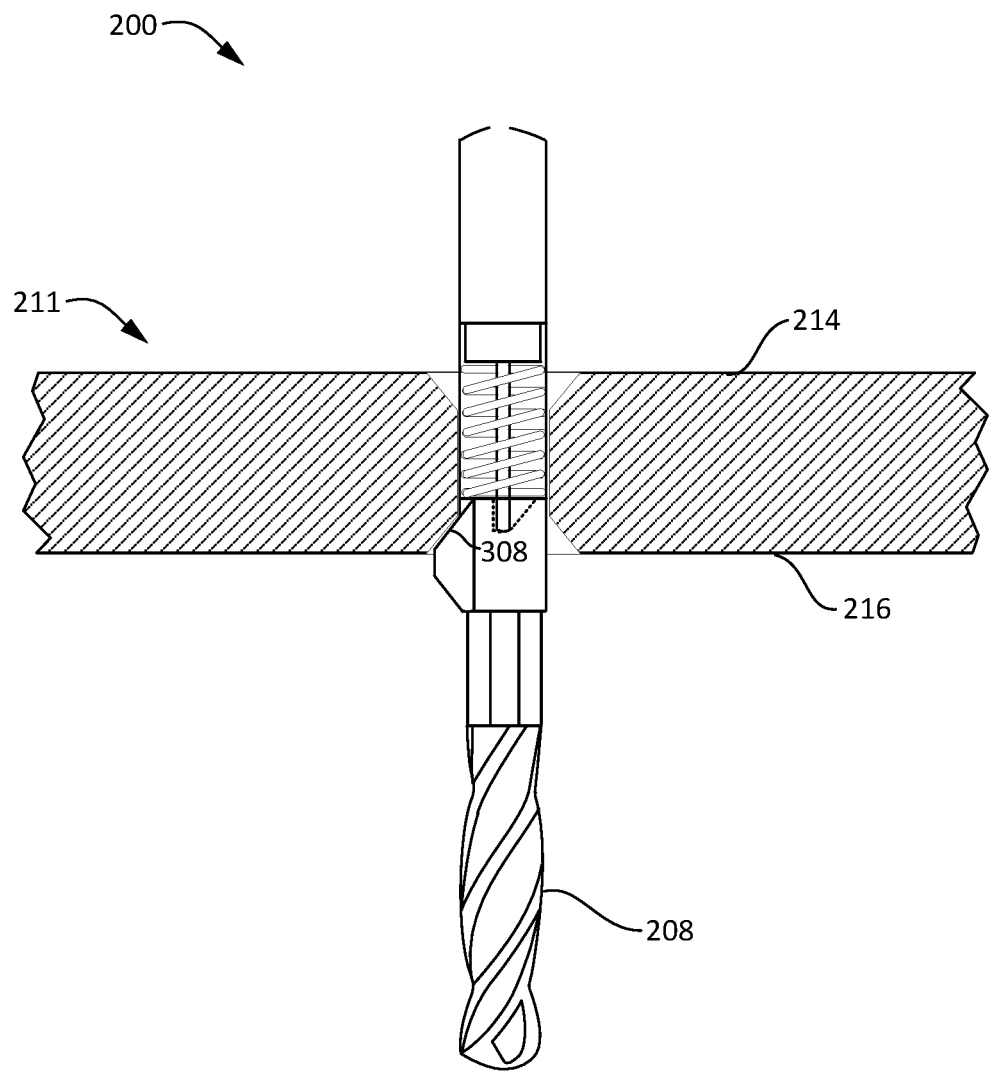
FIG. 5 is a side-view diagram illustrating another example of the cutting tool during the drilling process in accordance with examples of the present disclosure.

FIG. 5 is a side-view diagram illustrating another example of the cutting tool 200 during the drilling process in accordance with examples of the present disclosure. The depicted example illustrates a deburr/chamfer (i.e., material-removal position) operation of the far-side surface 216 that may occur after the deburr/chamfer operation of the near-side surface 214 and a material finishing operation of the internal surfaces of the bore (e.g., interior cylinder walls of the bore). After the controller 104 detects that the drill bit 208 has passed through the workpiece 211, and the near-side chamfer is complete, the controller 104 instructs the actuator to extend the MRA 210 and the first chamfer blade 308 cuts the far-side surface 216 to deburr/chamfer the bore opening in the far-side surface 216. This may occur as the cutting tool 200 is retracted from the workpiece 211.

Figure 6:
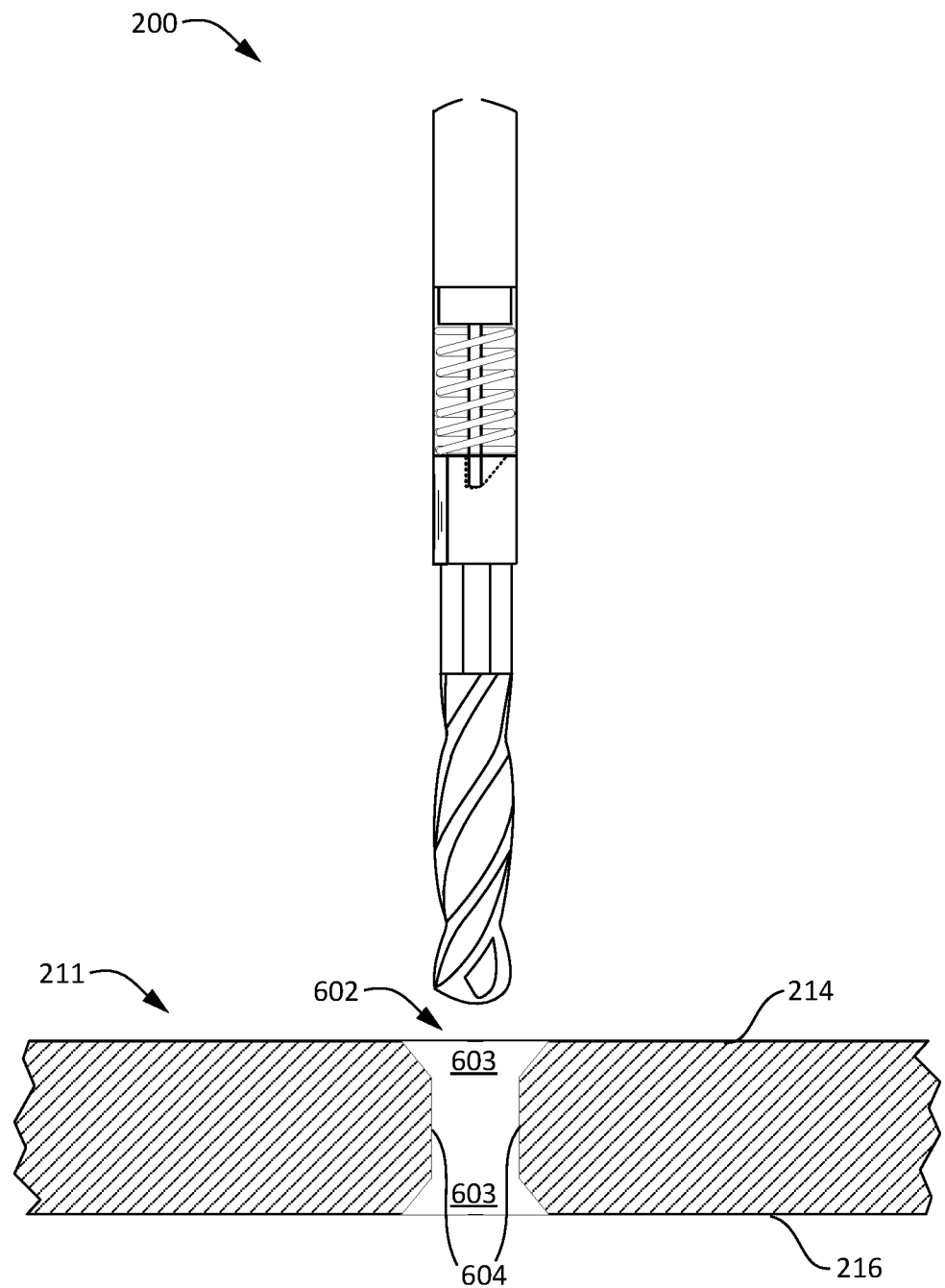
FIG. 6 is a side-view diagram illustrating another example of the cutting tool during the drilling process in accordance with examples of the present disclosure.

FIG. 6 is a side-view diagram illustrating another example of the cutting tool 200 during the drilling process in accordance with examples of the present disclosure. The depicted example illustrates a completed bore 602 in the workpiece 211. As depicted, the bore 602 includes chamfered regions 603 adjacent the near-side surface and the far-side surface, and cold-worked and burnished internal bore surfaces 604. The controller 104 is configured, in certain examples, to optionally perform a combination of finishing operations. For example, it may be desirable to not cold-work the internal bore surfaces 604, and accordingly the controller 104 is configurable to not extend the MRA 210 while inside the bore 602. Similarly, it may be desirable to only chamfer one, or none, of the surfaces of the workpiece 211.

Figure 7:
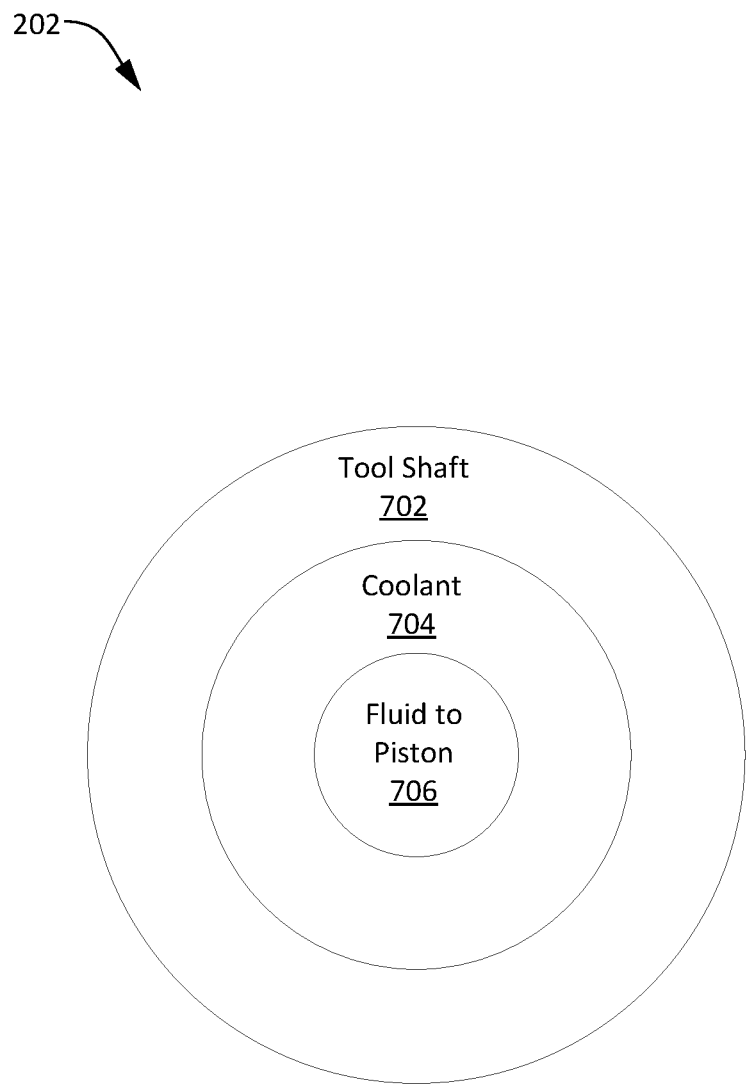
FIG. 7 is a transverse cross-sectional diagram illustrating one example of the drill body in accordance with examples of the present disclosure.

FIG. 7 is a transverse cross-sectional diagram illustrating one example of the drill body 202 in accordance with examples of the present disclosure. In the depicted example, the drill body 202 is formed with concentric chambers for allowing the flow of different fluids. The drill body 202, in certain examples, is formed with an outer tool shaft 702 that is rigid. A coolant channel 704 is disposed inside the tool shaft 702 and allows for the transfer of a coolant to the drill bit 208. A second channel 706 disposed within the coolant channel 704 allows for the hydraulic operation of the piston 212. In another example, coolant flow to the drill bit 208 may not be desirable, and in this example a single fluid chamber is disposed within the outer tool shaft 702.

Figure 8:
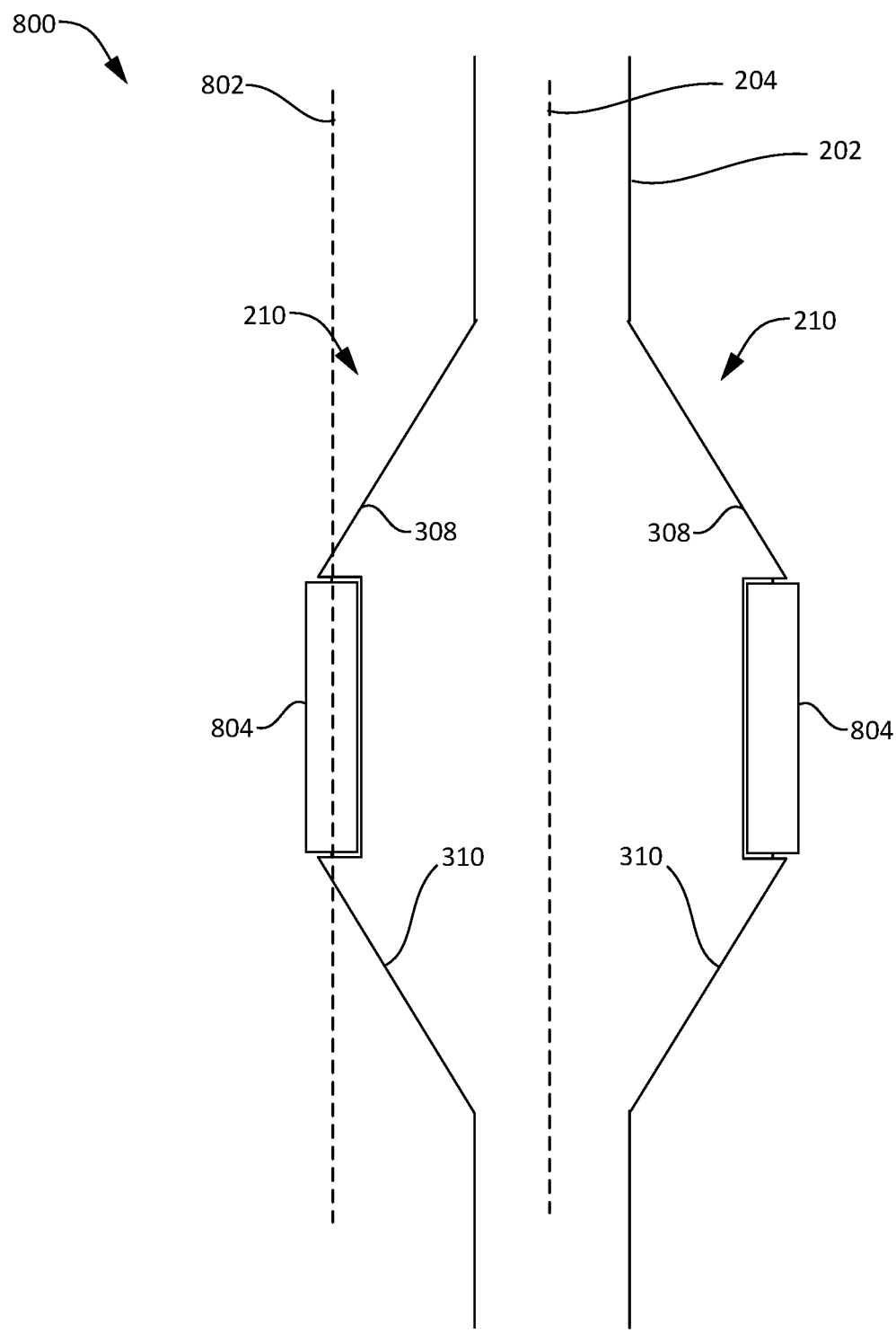
FIG. 8 is a side-view diagram illustrating one example of dual material reworking attachments in accordance with examples of the present disclosure.

FIG. 8 is a side-view diagram illustrating one example of dual material reworking attachments in accordance with examples of the present disclosure. In the depicted example, a partial view of the drill body 202 is shown with dual MRAs 210 in extended surface-finishing positions. Beneficially, a setup as depicted allows for maintaining concentricity within the bore during a hole finishing operation. In other words, a force applied by each MRA 210 to the internal bore surfaces cancels each other out, and accordingly the cutting tool is not displaced within the bore, as may occur if only a single MRA 210 is utilized.

In certain examples, the cold-working surface 804 is a roller-pin bearing, as depicted. The roller-pin bearing 804 is interposed between the first chamfer blade 308 and the second chamfer blade 310. The roller-pin bearing 804 applies a pressure to the internal bore surfaces to smear and compress the surface. Alternatively, the finishing surface may be a fixed surface as described above. In certain examples, the finishing surface (either the roller-pin style, or the fixed surface style) is disposed in a substantially parallel configuration with reference to the drill axis 204. This beneficially helps to maintain a desired bore profile (e.g., a profile with substantially parallel internal surfaces).

Figure 9:
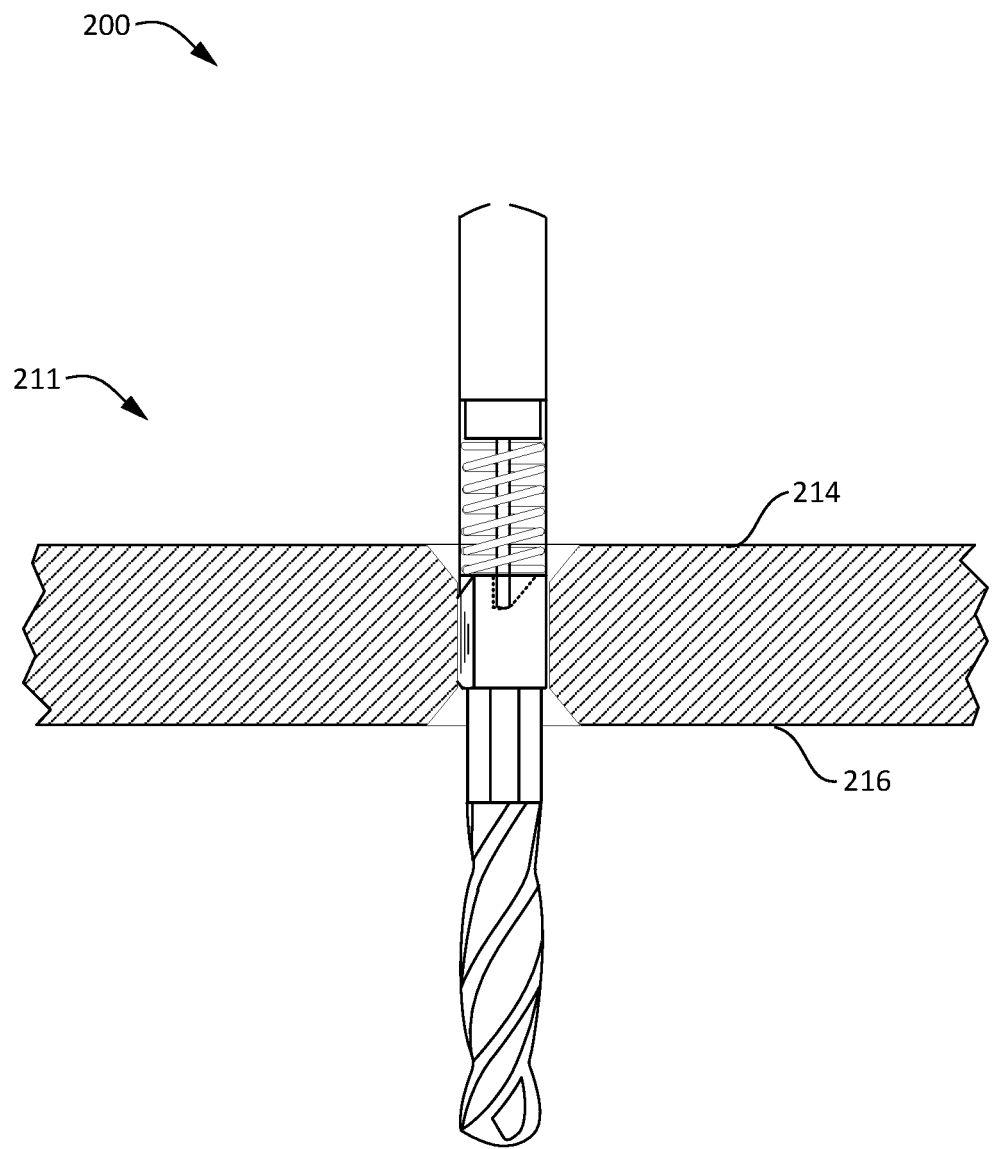
FIG. 9 is a side-view diagram illustrating another example of the cutting tool during the drilling process in accordance with examples of the present disclosure.

FIG. 9 is a side-view diagram illustrating another example of the cutting tool 200 during the drilling process in accordance with examples of the present disclosure. The depicted example illustrates one example of a surface-finishing position performing either a cold-working operation or a burnishing operation. The controller 104 instructs the actuator to extend the MRA 210 while the MRA 210 is within the bore. The cold-working operation may occur before or after the first or second chamfering operations. As depicted, the first and second chamfering operations have already occurred.

Figure 10:
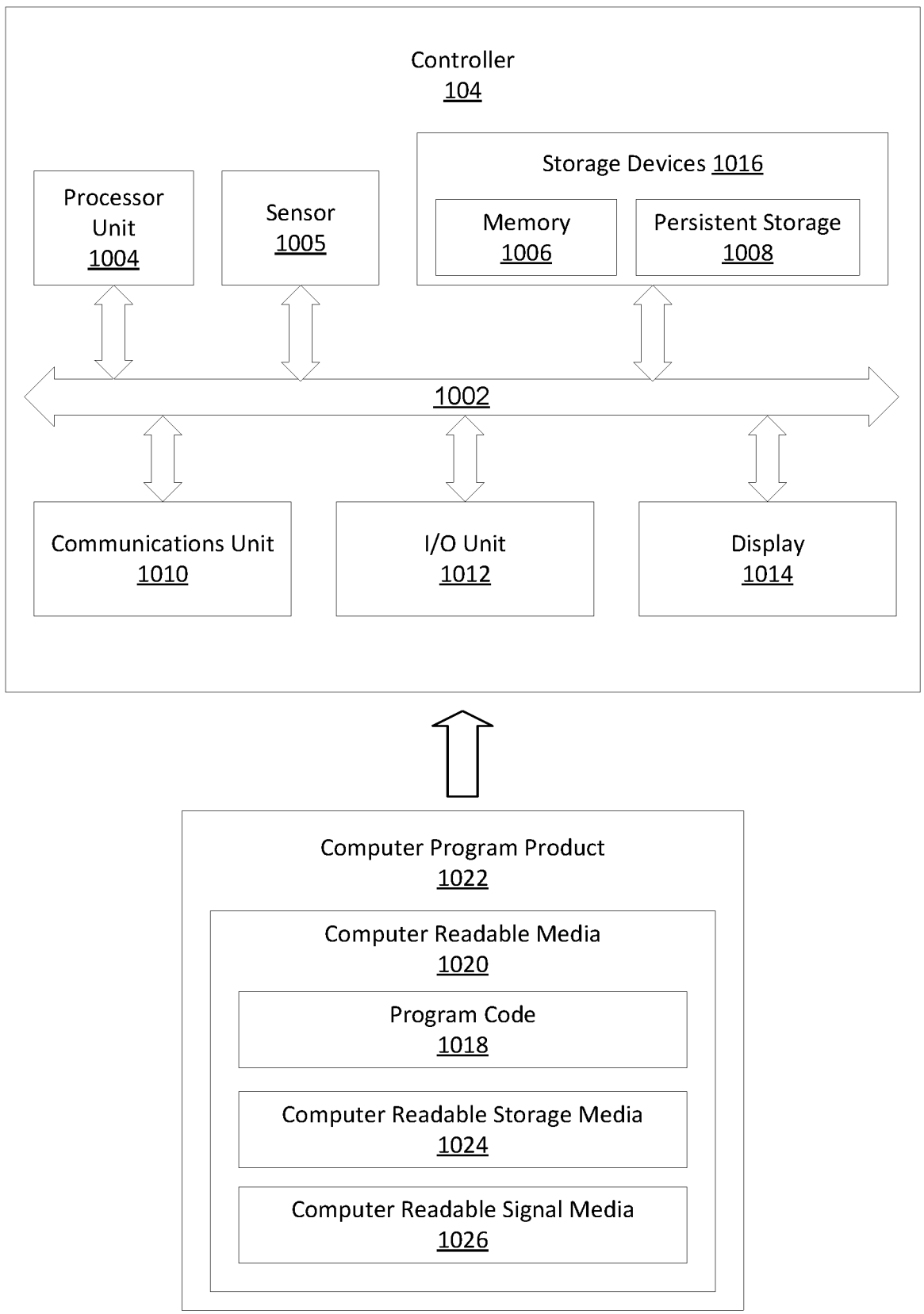
FIG. 10 is a schematic block diagram illustrating one example of the controller in accordance with examples of the present disclosure.

FIG. 10 is a schematic block diagram illustrating one example of the controller 104 in accordance with examples of the present disclosure. The controller 104 is an example of a computing device, which may be used to implement one or more components of examples of the invention, and in which computer usable program code or instructions implementing the processes may be located for the illustrative examples. In this illustrative example, the controller includes a communications fabric 1002, which provides communications between a processor unit 1004, the sensor 1005, memory 1006, persistent storage 1008, communications unit 1010, input/output (I/O) unit 1012, and display 1014.

The processor unit 1004 serves to execute instructions for software that may be loaded into memory 1006. The processor unit 1004 may be a set of one or more processors or may be a multi-processor core, depending on the particular implementation. Further, the processor unit 1004 may be implemented using one or more heterogeneous processor systems, in which a main processor is present with secondary processors on a single chip. As another illustrative example, the processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Memory 1006, in these examples, may be, for example, a random-access memory, or any other suitable volatile or non-volatile storage device. Persistent storage 1008 may take various forms, depending on the particular implementation. For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 may be removable. For example, a removable hard drive may be used for persistent storage 1008.

The communications unit 1010, in these examples, provides for communication with other data processing systems or devices. In these examples, the communications unit 1010 is a network interface card. The communications unit 1010 may provide communications through the use of either, or both, physical and wireless communications links.

The input/output unit 1012 allows for the input and output of data with other devices that may be connected to the controller 104. For example, the input/output unit 1012 may provide a connection for user input through a keyboard, a mouse, and/or some other suitable input device. Further, the input/output unit 1012 may send output to a printer. The display 1014 provides a mechanism to display information to a user.

Instructions for the operating system, applications, and/or programs may be located in the storage devices 1016, which are in communication with the processor unit 1004 through the communications fabric 1002. In these illustrative examples, the instructions are in a functional form on persistent storage 1008. These instructions may be loaded into memory 1006 for execution by the processor unit 1004. The processes of the different examples may be performed by the processor unit 1004 using computer implemented instructions, which may be located in a memory, such as the memory 1006.

These instructions are referred to as program code, computer usable program code, or computer readable program code that may be read and executed by a processor in the processor unit 1004. The program code, in the different examples, may be embodied on different physical or computer readable storage media, such as the memory 1006 or the persistent storage 1008.

Program code 1018 is located in a functional form on computer readable media 1020 that is selectively removable and may be loaded onto or transferred to the controller 104 for execution by the processor unit 1004. The program code 1018 and computer readable media 1020 form computer program product 1022. In one example, the computer readable media 1020 may be a computer readable storage media 1024 or a computer readable signal media 1026. The computer readable storage media 1024 may include, for example, an optical or magnetic disc that is inserted or placed into a drive or other device that is part of the persistent storage 1008 for transfer onto a storage device, such as a hard drive, that is part of the persistent storage 1008. The computer readable storage media 1024 also may take the form of a persistent storage, such as a hard drive, a thumb drive, or a flash memory that is connected to the controller 104. In some instances, the computer readable storage media 1024 may not be removable from the controller 104.

Alternatively, the program code 1018 may be transferred to the controller 104 using computer readable signal media 1026. Computer readable signal media 1026 may be, for example, a propagated data signal containing program code 1018. For example, the computer readable signal media 1026 may be an electromagnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative examples, the program code 1018 may be downloaded over a network to the persistent storage 1008 from another device or data processing system through the computer readable signal media 1026 for use within the controller 104. For instance, program code stored in a computer readable storage media in a server data processing system may be downloaded over a network from a server to the controller 104. The system providing the program code 1018 may be a server computer, a client computer, or some other device capable of storing and transmitting program code 1018.

The different components illustrated for the controller 104 are not meant to provide physical or architectural limitations to the manner in which different examples may be implemented. The different illustrative examples may be implemented in a controller including components in addition to and/or in place of those illustrated for the controller 104. Other components shown in FIG. 10 can be varied from the illustrative examples shown. The different examples may be implemented using any hardware device or system capable of executing program code. For example, a storage device in the controller 104 is any hardware apparatus that may store data. The memory 1006, persistent storage 1008, and the computer readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, the memory 1006 or a cache such as found in an interface and memory controller hub that may be present in the communications fabric 1002.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 11 is a schematic flowchart diagram illustrating one example of a method 1100 for active-pressure deburring and cold working in accordance with examples of the present disclosure. Portions of the method 1100 may be performed by processing logic that may comprise hardware (e.g., circuitry, dedicated logic, programmable logic, microcode, etc.), software (such as instructions run on a processing device), firmware, or a combination thereof. In one example, portions of the method 1100 are performed by the controller 104 of FIG. 1.

The method 1100 begins and, at block 1102, an active-pressure deburr and cold work tool is provided. In certain examples, the tool is provided with a material reworking attachment as described above with reference to FIGS. 1-10. The material reworking attachment is controllable and in operable communication with an actuator that is capable of modulating a pressure applied to the material reworking attachment.

At block 1104, the processing logic causes the tool to drill a hole in a workpiece. The hole, or bore, extends from a near-side surface of the workpiece to a far-side surface of the workpiece. At block 1106, the processing logic causes the tool to chamfer the near-side surface of the workpiece. At block 1108, the processing logic cold works the internal surfaces of the bore by causing the actuator to extend the MRA 210 and contact the finishing surfaces to the internal surfaces of the bore. At block 1110, the processing logic causes the tool to chamfer the far-side surface of the workpiece. In certain examples, the steps performed with reference to blocks 1106, 1108, and 1110 may be performed in any order, or not at all. The method 1100 then ends.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A cutting tool, comprising:
   a drill body, comprising a tubular housing, that defines a drill axis, and a tool window formed into the tubular housing;
   a drill bit extending from the drill body co-axially relative to the drill axis;
   a material reworking attachment, movably coupled to the drill body, storable within the tool window of the drill body, and extendable from the tool window in a direction angled relative to the drill axis into a surface-finishing position, and where the material reworking attachment comprises a finishing surface that remains parallel relative to the drill axis when the material reworking attachment is stored within the tool window of the drill body and as the material reworking attachment extends from the tool window into the surface-finishing position;
   a position manager, operatively coupled to the drill body and configured to identify a position of the cutting tool with reference to a workpiece; and
   an actuator coupled to the cutting tool and configured to transition the material reworking attachment to the surface-finishing position in response to the position manager identifying that the drill bit has formed a borehole in the workpiece.

2. The cutting tool of claim 1, where the actuator comprises a piston disposed within the drill body, where the piston includes a piston shaft that engages the material reworking attachment, and where the piston is moveable to cause a material reworking attachment transition from a stored position to the surface-finishing position.

3. The cutting tool of claim 2, where the piston is in fluid communication with a variable control valve that controls a pressure of a fluid that applies a force to the piston.

4. The cutting tool of claim 3, further comprising a controller operatively coupled with the variable control valve to adjust the pressure of the fluid.

5. The cutting tool of claim 1, where the actuator comprises an electric actuator disposed within the drill body and having a shaft that engages the material reworking attachment, where the shaft is moveable to cause a material reworking attachment transition from a stored position to the surface-finishing position.

6. The cutting tool of claim 1, where the borehole formed by the drill bit comprises a hole wall extending between a first workpiece surface and a second workpiece surface, where the drill bit cuts the bore starting with the first workpiece surface and exits through the second workpiece surface.

7. The cutting tool of claim 6, where the surface-finishing position comprises a first chamfering position and where the material reworking attachment further comprises a first chamfering blade that is configured to deburr a hole formed in the first workpiece surface when the material reworking attachment is in the first chamfering position that is angled relative to the drill axis.

8. The cutting tool of claim 7, where the surface-finishing position further comprises a second chamfering position and where the material reworking attachment further comprises a second chamfering blade that is configured to deburr a hole formed in the second workpiece surface when the material reworking attachment is in the second chamfering position that is angled relative to the drill axis, where the finishing surface is between the first chamfering blade and the second chamfering blade.

9. The cutting tool of claim 8, where the finishing surface comprises a roller-pin bearing disposed between the first chamfering blade and the second chamfering blade.

10. The cutting tool of claim 6, where the finishing surface engages the hole wall to one of cold work or burnish the hole wall.

11. A cutting tool comprising:
a drill body, comprising a tubular housing, that defines a drill axis, and a tool window formed into the tubular housing;
a drill bit extending from the drill body co-axially relative to the drill axis;
a material reworking attachment, movably coupled to the drill body, storable within the tool window of the drill body, and extendable from the tool window in a direction angled relative to the drill axis, into a material-removal position, and where the material reworking attachment comprises:
  a first chamfering blade, at a first angle relative to the drill axis;
  a second chamfering blade, at a second angle relative to the drill axis; and
  a finishing surface that remains parallel relative to the drill axis when the material reworking attachment is stored within the tool window of the drill body and as the material reworking attachment extends from the tool window into the material-removal position;
a position manager, operatively coupled to the drill body to identify a position of the cutting tool with reference to a workpiece; and
an actuator coupled to the cutting tool and configured to transition the material reworking attachment to the material-removal position in response to the position manager detecting that either the first chamfering blade or the second chamfering blade is adjacent a workpiece surface.

12. The cutting tool of claim 11, where the actuator comprises a piston disposed within the drill body, where the piston includes a piston shaft that engages the material reworking attachment, and where the piston is moveable to cause a material reworking attachment transition from a stored position to the material-removal position.

13. The cutting tool of claim 12, where the piston is in fluid communication with a variable control valve that controls a pressure of a fluid that applies a force to the piston.

14. The cutting tool of claim 13, further comprising a controller operatively coupled with the variable control valve to adjust the pressure of the fluid.

15. The cutting tool of claim 11, where the actuator comprises an electric linear actuator disposed within the drill body and having a shaft that engages the material reworking attachment, where the shaft is moveable to cause a material reworking attachment transition from a stored position to the material-removal position.

16. The cutting tool of claim 11, wherein the finishing surface is formed by a roller-pin bearing disposed between the first chamfering blade and the second chamfering blade.

17. A cutting tool comprising:
a drill body, comprising a tubular housing, that defines a drill axis, and a tool window formed into the tubular housing;
a drill bit extending from the drill body co-axially relative to the drill axis;
a material reworking attachment, movably coupled to the drill body, storable within the tool window of the drill body, and extendable from the tool window in a direction angled relative to the drill axis into one of either a surface-finishing position or a material-removal position, and where the material reworking attachment comprises:
  a first chamfering blade, at a first angle relative to the drill axis;
  a second chamfering blade, at a second angle relative to the drill axis; and
  a finishing surface that remains parallel to the drill axis when the material reworking attachment is stored within the tool window of the drill body and as the material reworking attachment extends from the tool window into the surface-finishing position or the material-removal position, wherein the finishing surface is interposed between the first chamfering blade and the second chamfering blade;
a position manager, operatively coupled to the drill body to identify a position of the cutting tool with reference to a workpiece; and
an actuator coupled to the cutting tool to transition the material reworking attachment from a stored position to the material-removal position, followed by a transition to the surface-finishing position, and followed by a transition to the material-removal position, where each transition is in response to the identified position of the cutting tool with reference to the workpiece.

18. The cutting tool of claim 17, where the actuator comprises a piston disposed within the drill body, where the piston includes a piston shaft that engages the material reworking attachment, and where the piston is moveable to cause the material reworking attachment to transition from the stored position to one of either the surface-finishing position or the material-removal position.

19. The cutting tool of claim 18, where the piston is in fluid communication with a variable control valve that controls a pressure of a fluid that applies a force to the piston.

20. The cutting tool of claim 19, further comprising a controller operatively coupled with the variable control valve to adjust the pressure of the fluid.

* * * * *